March 18, 1952     H. L. BLUM     2,589,474
ADVERTISING DEVICE
Filed Sept. 23, 1950     3 Sheets-Sheet 1
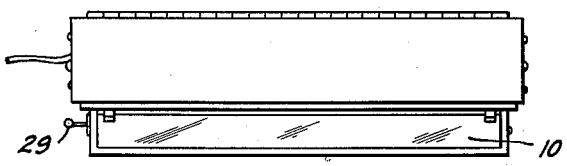
Fig. 1
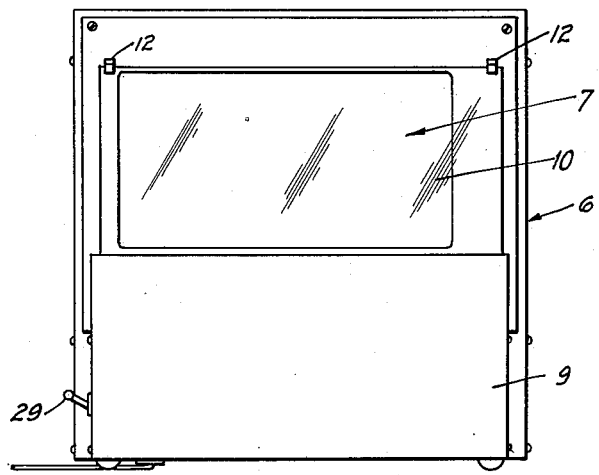 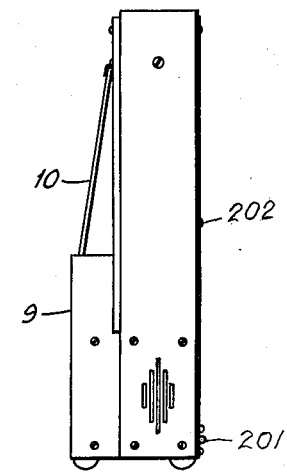
Fig. 2     Fig. 4
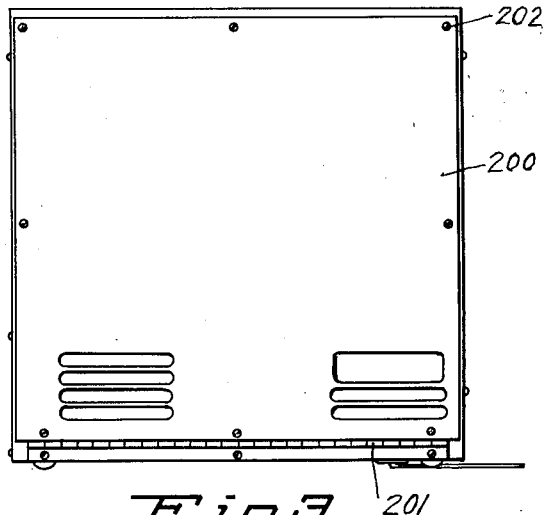
Fig. 3
INVENTOR.
HOSMER L. BLUM
BY
ATTORNEY

INVENTOR.
HOSMER L. BLUM

March 18, 1952  H. L. BLUM  2,589,474
ADVERTISING DEVICE
Filed Sept. 23, 1950  3 Sheets-Sheet 3
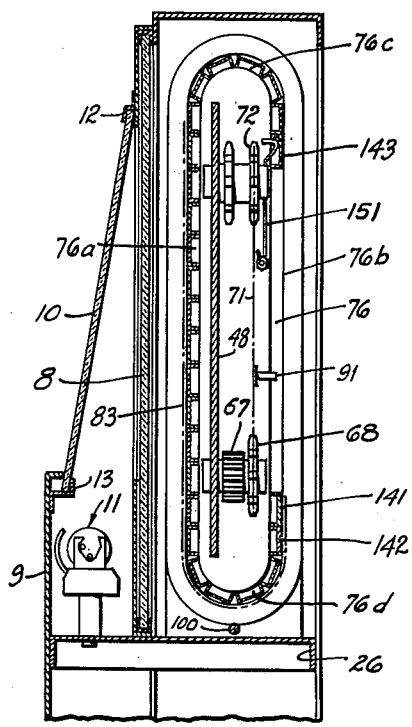
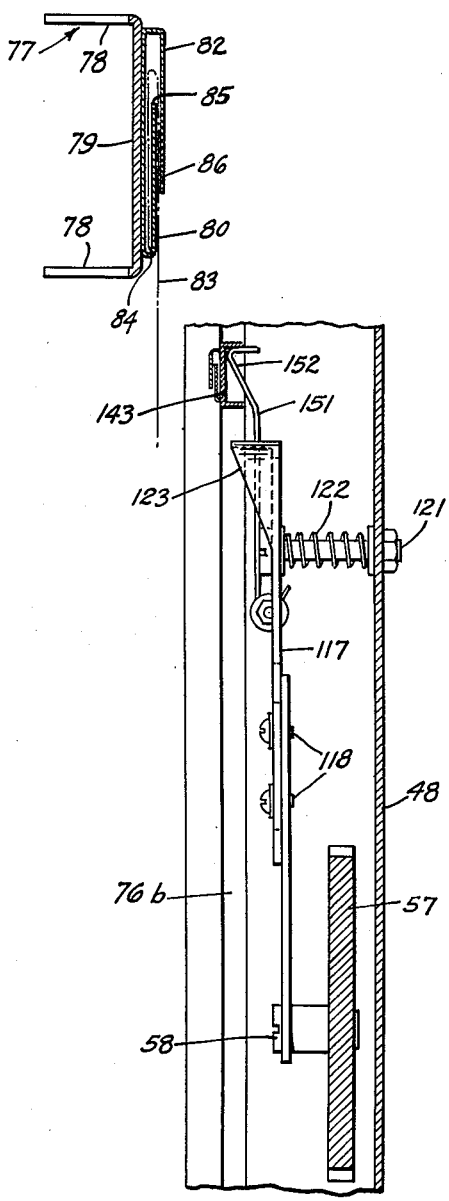
INVENTOR.
HOSMER L. BLUM
BY
ATTORNEY Patented Mar. 18, 1952

2,589,474

UNITED STATES PATENT OFFICE 2,589,474

ADVERTISING DEVICE

Kosmer L. Blum, Burlingame, Calif., assignor to L. Chace Grover

Application September 23, 1950, Serial No. 186,466

5 Claims. (Cl. 40—36)

This invention relates to a display device of the type shown in the Roberts Patent 2,099,142, of November 16, 1937. Such display devices include a plurality of advertising or display sheets moved successively into a display position, the device operating continuously and displaying each sheet successively for a matter of several seconds. A device of this type must be relatively inexpensive to manufacture and yet rugged, simple and positive in operation.

It is in general the broad object of the present invention to provide a display mechanism for showing successively each of a series of sheets, particularly with a relatively simple, rugged mechanism.

The invention includes other objects and features of advantage, some of which, together with the foregoing, will appear hereinafter wherein the present preferred form of display device is set forth. In the drawings accompanying and forming a part hereof, Figure 1 is a top plan view.

Figure 2 is a front elevation.

Figure 3 is a back view of the device.

Figure 4 is a side elevation.

Figure 7 is a section taken along the line 7—7 in Figure 5.

Figure 8 is an enlarged view showing one of the carrier mechanisms utilized.

Figure 9 is a section taken along the lines 9—9 in Figure 5.

Figure 10 is a section taken along the sectional line 10—10 in Figure 5.

Figure 5:
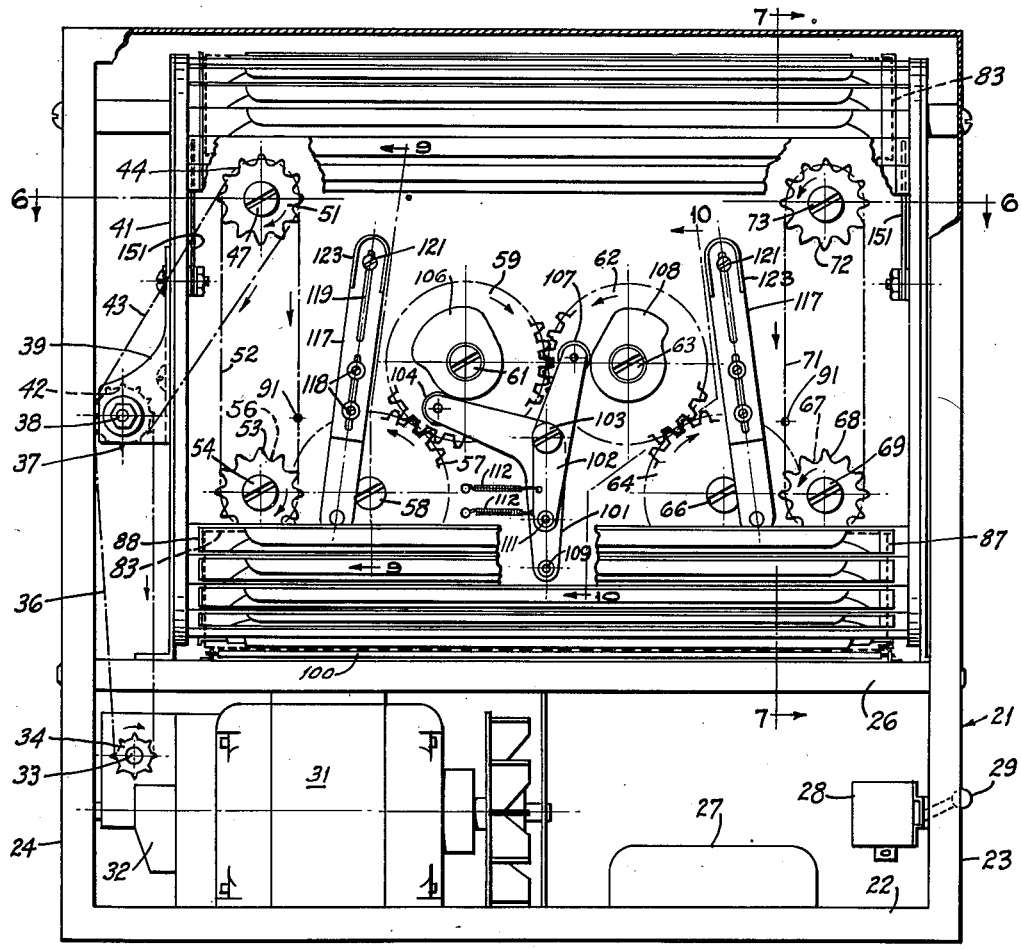
Figure 5 is a view of the rear of the device showing some of the operative mechanism.
Figure 6:
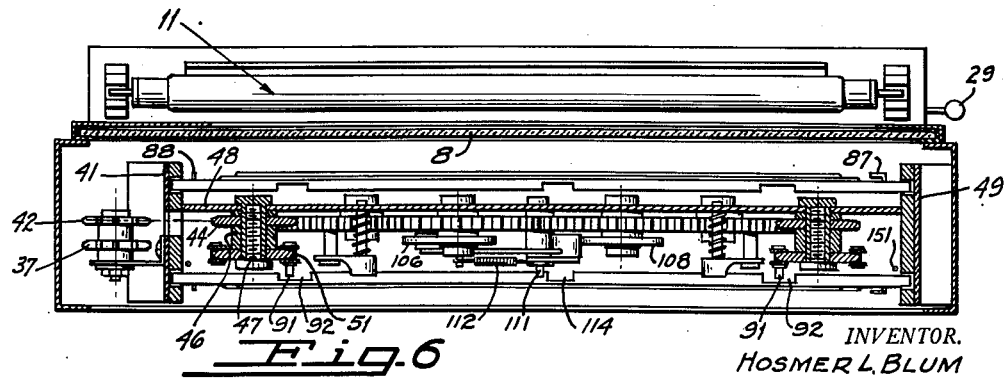
Figure 6 is a section taken along the line 6—6 in Figure 5.

Referring to the drawings, I provide a suitable casing and frame structure generally indicated at 6 and having an exhibit area indicated generally at 7 and covered with a first vertical sheet of glass 8. A fluorescent tube or other suitable lighting means is provided, this being geenrally indicated at 11, to illuminate the glass 8 and each of the display sheets which are sequentially positioned behind such glass for public view. Casing 6 includes an extending base portion 9, a second sheet of glass 10 being tilted between brackets 12 on an upper portion of the casing and bracket 13 on such bottom portion, as appears particularly in Figures 4 and 7, to throw light upwardly upon the display sheet which is in exhibited position.

The device includes a plurality of display sheets which are moved successively about a closed circuit which includes exposure at the exhibit area; for simplicity in illustration, because the showing of all sheets in position would be confusing, I have shown only one sheet, this being indicated at 83 in Figures 5 and 7 in display position, as will be further presently explained. Each display sheet is attached along one terminal end to a carrier bar, the several bars being arranged in a side by side relation everywhere in the circuit over which the bars are moved except in a portion of that region in the circuit which is spaced parallel and corresponds in circuit length to the area whereat the sheets are successively displayed. Each bar is advanced away from the exhibit area by a set increment, the sheets trailing from the successive bars in an overlapping relation. Thus, with the sheets of the same length, the incremental movement advances the sheet toward that position in which the bar immediately adjacent to the aforementioned portion carries the display sheet exposed at the exhibited area; each successive bar is advanced from such position along the circuit over a distance sufficient to move the display sheet from that position in which it is exhibited to one wherein the sheet is removed completely from view through the window and the next sheet is moved into view position and is aligned. The structure of this invention will now be described for accomplishing such movement of the display sheets.

Referring particularly to Figure 5, the device includes a suitable frame 21 having a base 22, side walls 23 and 24, and an intermediate transverse wall 26. Mounted upon the base 22 is a transformer 27 for operating the fluorescent light, a switch 28 being mounted upon the frame with an operating handle 29 extending therethrough to control operation of the fluorescent light and an electric motor 31 mounted upon the base 22.

Motor 31 includes a gear reduction mechanism 32 having a drive shaft 33 and a sprocket 34 thereon. A chain 36 is trained about the sprocket 34 and about another sprocket 37 mounted upon a stub shaft 38 rotatably mounted in a bracket 39, the latter being secured to a first vertical frame member 41. A second sprocket 42 is also secured upon the stub shaft 38 and a chain 43 is trained about the sprocket 42 and about another sprocket 44 carried upon a bushing 46, the bushing being rotatable about a support 47 mounted in a vertical wall 48 provided between the first frame member 41 and a second like frame member 49 provided upon the opposite side of the device. A sprocket 51 is mounted upon the bushing 46 to rotate with the sprocket 44. A chain 52 is trained about the sprocket 51 and about another sprocket 53 mounted for rotation on a suitable support 54. Mounted for rotation upon the support 54 and secured to the sprocket 53 is a spur gear 56 which is enmeshed with an idler gear 57; idler gear 57 is supported for rotation on a support 58; gear 59 mounted for rotation on a support 61, gear 59 in turn being engaged with a like gear 62 mounted for rotation about a support 63, gear 62 in turn driving an idler gear 64 mounted for rotation about a suitable support 66, idler gear 64 in turn driving a gear 67 like gear 56, gear 67 being mounted for rotation with a sprocket 68 about a support 69. A chain 71 is trained about the sprocket 69 and about a sprocket 72, corresponding to sprocket 51, sprocket 72 being mounted for rotation about a suitable support 73.

Each of frame members 41 and 49 includes a suitable, continuous track therein as is indicated at 76 in Figure 7. The track includes two parallel vertical straight legs 76a and 76b joined by an upper and a lower semi-circular portion, 76c and 76d. Leg 76a is adjacent the window while leg 76b is provided in back of and spaced from the window. The path of travel of a display sheet is downwardly past the window along leg 76a, thence around semi-circular portion 76d, up leg 76b and finally around the upper semi-circular portion; the movement is by a uniform predetermined step-wise advance except over a portion of leg 76b, as will presently appear.

Mounted for movement in the track 76 are a plurality of separate sheet carriers indicated generally at 77. Each carrier comprises a generally U-shaped member (see Figures 5–8 in Patent 2,099,142) having opposite legs 78 thereon joined by an intermediate member 79, the latter having a suitable receptacle therein for the mounting of a flexible paper display sheet; this receptacle includes a first U-shaped element 80 along one edge (Figure 8), and a second U-shaped element 82 overlying the first in an overlapping relation whereby a sheet, such as that indicated at 83, can be placed with its terminal end 84 in engagement with the lower portion of the first U-member 80 and thence upwardly and back between the two overlapping portions 85 and 86. A stop 87 is provided at one end of each carrier to limit the sheet insertion while a guide element 88 is provided at the other end of the carrier. The sheets can be inserted and removed readily, the casing including a back 200, hinged as at 201 and secured by screws 202, which exposes all of the operating mechanism. The sheets are attached successively to each bar as it is in position 143, the mechanism then being operated to advance another bar.

To move the elements successively, pins 91 are provided in the same relative position upon the chains 52 and 71 and each sheet carrier includes a recess 92 therein permitting the pin to pass downwardly to a position within the legs 78 on a carrier. However, upon the upward return of each pin, the carrier is in a position just above the end of semi-circular track portion 76d engaged by each of the pins 91 whereby it is moved upwardly over a distance corresponding to the exposed sheet distance viewed through the window and is transferred to the group at the upper portion of the frame.

To ensure the selective lift of only one carrier at a time, a bell crank 101 and a lever 102 are mounted upon a suitable pivot support 103. Bell crank 101 includes a cam follower 104 riding upon a cam 106 secured and rotating with gear 59. Lever 103 includes a cam follower 107 riding upon a cam 108 secured and rotating with gear 62. The bell crank carries a projecting pin 109 while lever 102 has a pin 111; the bell crank and the lever are respectively biased into engagement with their cooperating cams by springs 112. The configuration of the cams is such and their relative operation is so timed that pin 109 is engaged with a carrier when pin 111 is opposite slot 114 in a carrier. Thus, the uppermost carrier is moved upwardly while the next adjacent carrier is retained against movement by the pin 109; when the uppermost carrier bar is moved upwardly, pin 111 rides over the upper surface of a leg 78 to hold the next carrier in position while pin 109 is moved to a position opposite a slot 114 in the next lowermost carrier to permit this and the other carriers to move incrementally into position. In this manner, a timed, coordinated and incremental lifting operation of the several carriers is achieved.

To move each carrier out of engagement with the pins 91 and to continue their upward movement to a point beyond that to which the pins 91 could otherwise move a carrier, flexible pusher arms 117 are mounted upon each of gears 57 and 64 and extend upwardly; the pusher arms 117 are made in two parts adjustably secured together by studs 118 to permit of their adjustment to the correct length. Each pusher arm has a slot 119 at each end thereof fitting a bolt 121 provided to guide the upper end of each pusher arm, a spring 122 being provided about the bolt 121 to bias the upper end of each arm into pushing position and to permit the arms to be moved out of engagement with a carrier bar which it is lifting; this is accomplished by providing a cam 123 upon the upper end of each pusher bar and which is engaged by that carrier being lifted by the pins 91 while the pusher bar is moving the immediately preceding bar upwardly into position along the track.

To retain a transferred carrier in position after movement by the pusher arms, springs 151 are provided upon each of the side frame members 41 and 49 and include a suitably formed end portion 152 thereon to engage and fit within the U-shaped portion of each carrier bar.

In operation, each of the carrier bars include a suitable display sheet carrying a desired advertisement or other symbol to be exhibited, the successive sheets being laid one on top of another and extended about the casing in an overlying face-to-back relation. For simplicity in illustration, and because the showing of all sheets in position would be confusing, I have shown only one sheet 83; in Figures 5 and 7, this one sheet is shown in display position by the dotted line 83 and which corresponds to the actual sheet when in display position. The several sheets fit against one another in an overriding face-to-back engagement over guide roller 100 at the bottom of the casing and being confined by the casing. One should not be confused by the showing of the single sheet in Figure 7 because, with all the sheets in place, the casing is filled and the sheets are retained in sufficient frictional engagement that each sheet remains firmly in display position and is only moved from that position during the operation of the machine, as described. The motor operates the successive carrier bars one at a time. The length of each sheet is such that a sheet which is upon a bar in the position indicated at 141 in Figure 7 is extended completely about the front of the device and is exhibited, while the sheet affixed to a carrier in position 142, the next lower carrier, is out of registry with the exposed or exhibited area merely by the width of a carrier. When the mechanism is operated to lift a carrier from position 141 to the position of that bar indicated at 143, the sheet is moved completely across the face of the exposed area in which position it remains until the next bar is transferred.

I claim:

1. In a display device containing a show window and comprising a plurality of overlapping compacted displays, movably restrained in and partially filling a closed circuit therefor, motor driven means to move said displays one at a time along the empty portion of said circuit, each of said display devices being mounted on a carrier having a U-shaped back having a pair of spaced slots in one leg on said U-shaped back, said means comprising a pair of flexible chains movable over like paths extending across the empty portion of said circuit, a pin on each chain movable through a slot in a carrier to engage a flange on the U-back thereof to move that display device uppermost on one side of said empty portion to the other side of said empty portion of said circuit, means for retaining that display device against movement which is next to said uppermost display device, a pair of wheels operated in time with said chains, and a pair of pusher arms each engaged with and moved by each wheel and extending upwardly to engage the underside of a flange on a U-shaped carrier on the other side of said empty portion.

2. In a display device containing a show window and comprising a plurality of overlapping compacted displays, movably restrained in and partially filling a closed circuit therefor, motor driven means to move said displays one at a time from a first station along the empty portion of said circuit to a second station, each of said display devices being mounted on a carrier having a U-shaped back, each carrier having a pair of spaced slots in one leg on said U-shaped back, said motor means comprising a pair of flexible chains movable over like paths extending across the empty portion of said circuit, a pin on each chain movable in one direction through a slot in a carrier and in a second direction to engage a flange on the U-back thereof to move that display device which is at the first station to the second station on the other side of said empty portion of said circuit, means for retaining temporarily that display device against movement which is next to that display device which is at the first station, and means movable to advance a display device from the second station to a station beyond said second station on the other side of said empty portion beyond the point of advance of said chains immediately upon release thereof by said pins on said chains.

3. In a display device containing a show window and comprising a plurality of overlapping compacted displays, movably restrained in and partially filling a closed circuit therefor, motor driven means to move said displays one at a time from a first station on one side of an empty portion of said circuit to a second station on the other side of said empty portion of said circuit, each of said display devices being mounted on a carrier having a U-shaped back having a pair of spaced slots in one leg on said U-shaped back, said means comprising a pair of flexible chains movable over like paths extending across the empty portion of said circuit, a pin on each chain movable through a slot in a carrier to engage a flange on the U-back thereof to move that display device at said first station on one side of said empty portion of said circuit to the second station on the other side of said empty portion of said circuit, means for retaining temporarily that display device against movement which is next to that display device at said first station, means adjacent the second station for engaging and restraining a display device against return across said portion, a pair of wheels operated in time with said chains, and a pair of pusher arms each engaged with and moved by one of said wheels and extending upwardly to engage the underside of a flange on a U-shaped carrier on the other side of said empty portion.

4. In a display device containing a show window and comprising a plurality of overlapping compacted displays, movably restrained in and partially filling a closed circuit therefor, motor driven means to move said displays one at a time from a first station on one side of an empty portion of said circuit to a second station on the other side of said empty portion of said circuit, each of said display devices being mounted on a carrier having a U-shaped back having a pair of spaced slots in one leg on said U-shaped back, said means comprising a pair of flexible chains movable over like paths extending across the empty portion of said circuit, a pin on each chain movable through a slot in a carrier to engage a flange on the U-back thereof to move that display device at said first station on one side of said empty portion to the second station on the other side of said empty portion of said circuit, means for retaining that display device against movement which is next to that display device which is at said second station, a spring positioned adjacent each end of that U-shaped carrier which is immediately adjacent the second station for engaging and restraining a display device against return across said portion, a pair of wheels operated in time with said chains, and a pair of pusher arms each engaged with and moved by one of said wheels and extending upwardly to engage the underside of a flange on a U-shaped carrier while the carrier is engaged with said springs.

5. In a display device containing a show window and comprising a plurality of overlapping compacted displays, movably restrained in and partially filling a closed circuit therefor, motor driven means to move said displays one at a time from a first station on one side of an empty portion of said circuit to a second station on the other side of said empty portion of said circuit, each of said display devices being mounted on a carrier having a U-shaped back having a pair of spaced slots in one leg on said U-shaped back, said means comprising a pair of flexible chains movable over like paths extending across the empty portion of said circuit, a pin on each chain movable through a slot in a carrier to engage a flange on the U-back thereof to move that display device which is at said first station on one side of said empty portion to the second station on the other side of said empty portion of said circuit, means for retaining that display device against movement which is next to that display device at said first station, a pair of wheels operated in time with said chains, a pair of pusher arms each engaged with and moved by one of said wheels and extending upwardly to engage the underside of a flange on a U-shaped carrier, a pair of cams driven respectively in a timed relation to said wheels, a first cam follower engaged with one of said cams, a first bell crank carrying said first cam follower at one end thereof and having its other end provided adjacent to said first station and oscillated by one of said cams transversely of the direction of movement of said carriers across said empty portion to engage and release a U-shaped back on a carrier at the first station, a second cam follower engaged with one of said cams, a second bell crank carrying said second cam follower at one end thereof and having its other end provided adjacent to said first station and oscillated by one of said cams alternately with respect to the first bell crank and transversely of the direction of movement of said carriers across said empty portion to engage and release a U-shaped back on a carrier adjacent to said first station.

HOSMER L. BLUM.

REFERENCES CITED

The following references are of record in the file of this patent:

UNITED STATES PATENTS

| Number | Name | Date |
|---|---|---|
| 2,099,142 | Roberts | Nov. 16, 1937 |
| 2,129,023 | Roberts | Sept. 6, 1938 |
| 2,228,137 | Hutchinson | Jan. 7, 1941 |